US006206947B1

(12) United States Patent
Evans et al.

(10) Patent No.: US 6,206,947 B1
(45) Date of Patent: Mar. 27, 2001

(54) PROCESS FOR MAKING AN ANIMAL LITTER COMPRISING GYPSUM, ALUMINUM SULFATE AND UREA

(75) Inventors: Donald Frederick Evans, Pinehurst; Richard Binion Steele, Arden, both of NC (US); Malcolm Edward Sumner, Watkinsville, GA (US)

(73) Assignee: Waste Reduction Products Corp., Charlotte, NC (US)

( * ) Notice: Subject to any disclaimer, the term of this patent is extended or adjusted under 35 U.S.C. 154(b) by 0 days.

(21) Appl. No.: 09/475,342

(22) Filed: Dec. 30, 1999

Related U.S. Application Data

(60) Division of application No. 09/070,084, filed on Apr. 30, 1998, now Pat. No. 6,029,603, which is a continuation-in-part of application No. 08/719,953, filed on Sep. 24, 1996, now abandoned.
(60) Provisional application No. 60/001,222, filed on Jul. 19, 1995.

(51) Int. Cl.[7] ............................... C05D 9/00; A01K 1/015
(52) U.S. Cl. ............................... 71/63; 119/171; 119/173; 252/184; 502/400
(58) Field of Search .................... 119/171, 173, 119/54; 71/63; 502/400; 252/184; 23/3.3 R

(56) References Cited

U.S. PATENT DOCUMENTS

| 3,660,068 | * | 5/1972 | Wilson ........................ 71/34 |
| 4,163,674 | * | 8/1979 | Been ......................... 106/15.05 |
| 4,183,763 | * | 1/1980 | Omilinsky et al. ................ 106/109 |
| 4,264,543 | * | 4/1981 | Valenta ........................ 264/37 |
| 4,283,423 | * | 8/1981 | Watkins et al. .................. 426/69 |
| 4,409,925 | * | 10/1983 | Brundrett et al. ................ 119/1 |
| 4,459,368 | * | 7/1984 | Jaffee et al. ................... 502/80 |
| 4,509,457 | * | 4/1985 | Durbye ........................ 119/1 |
| 4,622,920 | * | 11/1986 | Goss .......................... 119/1 |
| 4,704,989 | * | 11/1987 | Rosenfeld ..................... 119/1 |
| 5,014,650 | * | 5/1991 | Sowle et al. .................. 119/171 |
| 5,317,990 | * | 6/1994 | Hughes ....................... 119/173 |
| 5,343,808 | * | 9/1994 | Collar ........................ 102/361 |
| 5,371,054 | * | 12/1994 | Pluta et al. ................... 502/62 |
| 5,386,803 | * | 2/1995 | Hughes ....................... 119/173 |
| 5,452,684 | * | 9/1995 | Elazier-Davis et al. ........... 119/173 |
| 5,469,809 | * | 11/1995 | Coleman ....................... 119/173 |
| 5,503,111 | * | 4/1996 | Hughes ....................... 119/173 |
| 5,577,463 | * | 11/1996 | Elazier-Davis et al. ........... 119/173 |
| 5,648,306 | * | 7/1997 | Hahn et al. ................... 502/80 |
| 5,662,067 | * | 9/1997 | Stubbs et al. .................. 119/173 |
| 5,664,523 | * | 9/1997 | Ochi et al. ................... 119/173 |

FOREIGN PATENT DOCUMENTS

3644826 * 7/1987 (DE).
573303 * 12/1993 (EP).

OTHER PUBLICATIONS

Browning, Agglomeration, Growing Larger in Applications & Technology Chemical Engineering Dec. 4, 1967, pp 142–165.*

* cited by examiner

Primary Examiner—Gary P. Straub
(74) Attorney, Agent, or Firm—Alston & Bird LLP

(57) ABSTRACT

There is provided an animal litter composition of agglomerated or compacted calcined calcium sulfate absorbent. The animal litter is screened to a particle size between 6 mesh and about 100 mesh. In another aspect of the invention, an effective amount of a binder such as a clay, lignin or starch is added to the calcium sulfate to assist the calcium sulfate to pelletize. The pelletized calcium sulfate is sized and calcined. The litter compositions are effective in absorbing urine, clumping and are easily disposed of. There is also disclosed processes for making the animal litter compositions.

8 Claims, No Drawings

PROCESS FOR MAKING AN ANIMAL LITTER COMPRISING GYPSUM, ALUMINUM SULFATE AND UREA

CROSS-REFERENCE TO RELATED APPLICATION

This application is a divisional of U.S. patent application Ser. No. 09/070,084 filed Apr. 30, 1998 and now U.S. Pat. No. 6,029,603 which application is a continuation-in-part of U.S. Pat. application Ser. No. 08/719,953, filed Sep. 24, 1996 now abandoned, claiming priority from Provisional Application No. 60/001,222, filed Jul. 19, 1995, now expired.

BACKGROUND OF THE INVENTION

1. Field of the Invention

The present invention relates to animal litter absorbent compositions and to processes for making the litter compositions. More particularly, the present invention relates to an animal litter absorbent composition based on calcium sulfate that may be used for both indoor pets and outdoor farm animals.

2. The Prior Art

Animal litters are useful for absorbing animal urine and to encapsulate animal feces until the litter is either cleaned-up or otherwise disposed of. The most commonly used absorbent materials are clays that are safe and non-irritating to the animal and that absorb relatively large amounts of liquids. Animal urine forms ammonia which has an unpleasant odor. The clay materials only absorb and hold urine resulting in a source of odor requiring frequent replacement and disposal of the litter.

Efforts have been made to develop a litter capable of disposing of both solid wastes and liquid wastes. This led to the development of clumping litters in the form of finely ground particles of certain clays, sometimes augmented by binders or additives to form discernable clumps when contacted by animal waste. These particles clump in the presence of liquid wastes, which is scooped up and removed with the solid wastes. Although the clumping litters enable a cat owner to remove waste without disposing of the entire contents of the litter box, these clumping litters are frequently dusty and the odor problem remains. Animal litters sometimes contain other absorbents such as wood chips, sawdust or sand but most of the cat litter products currently in commerce are manufactured from ground clay. These products are not water-soluble and thus are difficult to dispose of properly.

In addition to cat litter, problems exist with the growing environmental demand to ban waste water lagoons in mass production hog farms. The existing flush water systems currently in use by the swine industry are inadequate to control odor and pose other environmental risks by dangerous proximity to water tables.

A material useful as cat litter is described in U.S. Pat. No. 4,459,368 to Jaffe et al., which discloses a mixture of fuller's earth, preferably in the form of calcium bentonite, mixed with calcium sulfate dihydrate at a weight ratio of 1:9 to about 3:7. In addition, the particle size of the clay and the calcium sulfate dihydrate are such that no more than about 60 weight % of clay and about 20 weight % of calcium sulfate particle are retained on a 6 mesh sieve screen. The manner of mixing is not important as the clay and calcium sulfate dihydrate are simply mixed to form the cat litter. The patent states that the ratio of the weight of clay particles to the weight of calcium sulfate is important in order to maximize the liquid absorbing effect.

Another cat litter product is described in U.S. Pat. No. 5,469,809 to Coleman, wherein there is disclosed a litter having clumping characteristics. The litter comprises a mixture of opal clay and sodium bentonite formed into smooth round balls to eliminate dusting. There is also disclosed a cat litter having up to ten percent of a lignosulfonate. The lignosulfonate is said to help form and maintain a smooth round shape for the resulting litter granules. The litter is formed by mixing the opal clay and sodium bentonite, pelletizing in a disc pelletizer to form the spherical pellets and then screening to the desired size.

An animal litter that is said to form clumps is disclosed in the Elazier-Davis et al. patent, U.S. Pat. No. 5,452,684, directed to a method of agglomerating a smectite clay litter. Therein the clay is sheared in an extruder to align the clay platelets to produce a litter having stronger clumps. The smectite clay may be mixed with a small amount of water-soluble adhesive such as carboxymethylcellulose, alginate, starches, gums and the like to form the coherent clumps. The preferred clay is sodium bentonite which absorbs liquids such as urine and interacts with nearby clay particles to form strong clumps through physical reaction. However, this product simply holds the urine and does not reduce or eliminate the odor.

In addition to the above-disclosed litter products, it is also known that calcium sulfate may be mixed with soluble salts including urea to form a granulated soil additive product such as disclosed in U.S. Pat. No. 3,660,068 to Wilson. Along these same lines, U.S. Pat. No. 3,976,467 and 2,154,541, both to fertilizer-type products, also combine calcium sulfate or gypsum with urea.

Thus, there continues to be a need for an animal litter which is easily disposable. In addition there is need for an animal litter which has a high density to prevent tracking and in which the pungent ammonia odor of the animal urine is reduced.

SUMMARY OF THE INVENTION

It is an object of the present invention to provide an animal litter that absorbs large amounts of animal urine, has good clumping and tracking characteristics, and is substantially dust free, environmentally safe.

In accordance with the present invention there is provided an animal litter which has been developed in response to growing environmental concerns and consumer trends to premium grade litter products that clump on contact with animal waste.

In its broadest aspects, the present invention provides a calcined calcium sulfate absorbent as an animal litter which is made by compacting the calcium sulfate to increase the density or by adding a binder to the calcium sulfate powder and agglomerating or compacting. The materials which are primarily used to make the animal litter of the present invention include gypsum, waste gypsum separated from wallboard, synthetic gypsum, and combinations of these materials.

In the embodiment wherein the calcium sulfate is compacted, it is passed through an extruder to increase the density to produce a litter having the desired properties. The compacted calcium sulfate is then screened to a particle size range between a 4 mesh and about 100 mesh, U.S. sieve series, and dried until calcined. Depending upon the end use of the litter, the most typical particle size is between 8 mesh and 40 mesh.

In another embodiment of the product of the present invention it has been found that an animal litter having the desired properties may be made by adding to calcium sulfate an effective amount of a binder to agglomerate, thus forming pellets, pelletizing and calcining. Preferred binders include certain clays, especially bentonite clay, lignins and starches. The effective amount of binder will depend upon the binder selected. For example, when bentonite clay is the binding agent, it may be present in an amount up to about 5.0%. Other binders will generally range in amounts from about 0.25% to about 10.0% by weight of the total composition, preferably from about 0.5% to about 2.0% by weight. Optionally, trace additives such as sodium bicarbonate, *Yucca schidigera* and other olfactory agents may be added in amounts up to about 5.0 by total weight, preferably 1.5% to 4.0% by weight, for ammonia and odor control.

Another aspect of the present invention is to provide a process for producing animal litter. In one of the processes of this invention, calcium sulfate is crushed and screened to a powder. A paste of powdered calcium sulfate is prepared and the paste is compacted by passing the paste through an extrusion mill at a pressure up to 1000 p.s.i., typically from about 300 p.s.i. to about 500 p.s.i., to form noodles which are broken into pellets. The compacted pellets are screened to the desired size to remove fines and oversized particles. The pellets are then heated at a temperature from about 50° C. to about 430° C. until the calcium sulfate is calcined. Litter made according to this process does not require a binder because the compaction of the extrusion and the heating provide a calcined, hard product. However, when it is desirable to add a binder, such as when lower temperatures are used, the binder may be added when the paste is formed.

Alternatively, it has been found that the animal litter may be made by crushing calcium sulfate, waste gypsum, or synthetic gypsum to a powder, and optionally, screening to remove any paper backing. The powdered calcium sulfate is mixed with a dry binder prior to introduction onto a pelletizer or the binder is added by misting an aqueous solution containing the binder onto the powdered calcium sulfate in a pelletizer, pelletizing, screening to a predetermined size, and drying to calcine the pellets. Using this process the calcium sulfate absorbent is not compressed.

In yet another embodiment of the present invention, it has been found that an animal litter may be made by mixing calcium sulfate, waste gypsum or synthetic gypsum in powdered form (mixing the gypsum with up to 8% of urea and drying in an oven at a temperature above which the urea will melt to bond the particles together), pelletizing and screening to a predetermined size and drying to calcine the pellets. An additional aspect of this embodiment of the invention is to add to the gypsum urea mixture an hydrous aluminum sulfate and sulfuric acid. This latter embodiment of the invention is particularly useful to form a cat litter having deodorizing properties.

The animal litter of this invention is effective in absorbing urine, eliminating waste odor and is easily disposed of. The water-soluble properties of the animal litters of this invention allow the litter to be flushed with no adverse consequences to plumbing or the environment. Because the animal litter product is primarily calcium sulfate, an agriculturally valuable product, disposal of encapsulated waste can be accomplished by spreading it on land.

Other objects, features and advantages of the present invention will be apparent from the following detailed description of the invention.

DETAILED DESCRIPTION OF THE INVENTION

The animal litter of the present invention is substantially dust free, environmentally safe and effective, absorbs large amounts of animal urine, and has good clumping and tracking characteristics. In its broadest aspects the animal litter is made from calcined calcium sulfate.

The materials which are used to make the animal litter of the present invention include gypsum, waste gypsum, such as wallboard scrap, synthetic gypsum and combinations of both. The gypsum may be separated from wallboard, i.e., the paper having been removed, or from whole wallboard, e.g., the gypsum and paper being ground together and both being incorporated into the litter. The drywall sheetrock or wallboard scrap is collected at construction sites and hauled to a process yard where this scrap is crushed and screened to separate the paper from the gypsum. The synthetic gypsum may, for example, be waste or by-product gypsum from various industrial processes such as flue gas desulphurization.

In one embodiment, a clumping litter has been made by simply separating the gypsum from wallboard and grinding and screening it to an optimal particle size range, compacting, forming pellets, screening and calcining. The calcium sulfate is stabilized by compacting the calcium sulfate to increase its density by passing the calcium sulfate powder through an extruder. It has been found that a litter having the desired properties is formed at extrusion pressures up to about 1000 p.s.i., preferably a pressure between 300 p.s.i. and 500 p.s.i. The compacted material is screened to a particle size between 4 mesh and about 100 mesh, U.S. sieve series. The size of the particles desired will be determined by the intended end use, such as cat litter or swine litter, with the particle size being preferably between 8 mesh and 40 mesh.

The pellets are dried sufficiently to be converted into a hemihydrate (one molecule of $H_2O$ for each molecule of $CaSO_4$) form of calcium sulfate or the anhydride form (no water molecules). These hemihydrate and/or anhydride granules are essentially plasters (Plaster of Paris) and with the addition of water or urine they clump together encapsulating the waste. The process of removing these chemically bound water molecules is known as calcination. The temperature needed to begin calcination of gypsum dihydrite (two water molecules) is about 50° C. At about 150° C. conversion to the anhdrite form takes place, however, at this low temperature level this anhydride form of gypsum is known as soluble anhydride and is somewhat unstable, that is, it will tend to absorb water out of the air and convert to a hemihydrate. If, however, the gypsum is heated to about 430° C. then the anhydride gypsum then formed is stable and the only way for it to absorb water is to come into direct contact with liquid water or urine. The chemical effect of calcined gypsum (dehydrated calcium sulphate, $CaSO_4$) on ammonia ($NH_3$) is isolation of the nitrogen which prevents an ammonia gas emission.

In another embodiment of the animal litter, a binder is added to the calcium sulfate absorbent to assist in pellet formation. It has been found that effective binders may include, for example, clays, lignins, starches, gums, cellulosic ethers, and water-soluble polymers. Although the amount of binder will vary depending upon the binder, it is preferable to use an amount of binder necessary to promote the desired pellet formation.

When a clay is the binder, typical clays include montmorillonite, kaolin, illite, halloysite, vermiculite, attapulgite, seppiolite, smectite, fuller's earth and the like. The bentonite clays are preferred for their absorbing and binding properties, especially the sodium and calcium bentonites (clays largely composed of montmorillonite but which can also contain beidellite, attapulgite, and similar minerals). When the clay binder is bentonite clay, it may be mixed with the calcium sulfate in amounts up to about 5.0% by weight, preferably from about 0.5% by weight to about 2.0% by weight. Other clay binders may be used in amounts up to about 10.0% by weight.

Another suitable class of binders are lignin binders. Lignin is a polymeric substance composed of substituted aromatics primarily obtained as a by-product of the pulp and paper industry from the residual pulping liquors. Lignin obtained by any pulping method or from any source may be used in the process of this invention as long as the lignin is in a form which becomes soluble in water, such as lignosulfates and sulfonated lignin. Among the lignins which may be used as binders are calcium lignosulfonate, sulfonated lignin, such as sodium sulfonated lignin, POLYFON F® and sulfonated alkali lignin, REAX® 80C. These lignin are available from Westvaco Corporation, North Charleston, S.C. When a lignin is the binder, it may be used in amounts up to about 5.0% by weight (solids), preferably from about 1.5% to about 3.0% by weight (solids).

Other binders include water-soluble cellulosic ethers, such as carboxymethyl-cellulose. When cellulose ethers are used as the binder, they may be added to the calcium sulfate in an amount up to about 2.0% by weight, preferably in an amount up to about 1.0% by weight. In addition, starches, such as wheat paste; gums, such as xanthin gum, guar gum; alginates; and water-soluble polymers such as polyvinyl pyrrolidone and polyvinyl alcohol are useful water-soluble binders. These binders may be used in amounts up to 5.0%.by weight. To include amounts of these binders above about 5.0% does not increase the desired properties of the pellets to any appreciable extent.

The animal litter pellets may also include odor controlling trace additives such as sodium bicarbonate, yucca schidigera or olfactory agents consistent with the level of product sophistication in odor control specified for manufacture. These trace additives may be present in the litter in amounts up to about 5.0% by total weight of the litter, preferably from 1.5% to 4.0% by weight.

For domestic litters, dusting and tracking is a problem and therefore a litter of at least +100 mesh is desirable. Given the difficulty of screening to 100 mesh at high production rates, the litter will be preferably screened at about +40 mesh, U.S. Standard Screen Series (ASTM). Other separation techniques can be employed which can remove the dusty particles down in the range of 100 mesh, such as air separation. The importance of the upper particle size ranges is related to the ultimate "lumpability" of the litter. Large particle sizes or coarsely graded litters will not clump together as well. Therefore it is desirable to have an even particle size distribution that lends itself to a maximum packing arrangement. Given the separation techniques, a maximum particle size of about 4 mesh is workable, but 6 Or 8 mesh is usually better for clumping. Commercial (hog) litters do not need to be as dustless and could probably be used without screening out any fines at all.

Another aspect of the present invention is to provide a process for producing the animal litter.

In one preferred process, gypsum, waste gypsum, synthetic gypsum or a combination thereof is processed to a powder form and the gypsum powder is conveyed to a mixing station where a paste is formed with water. The paste will generally have from 10% by weight to about 30% by weight water. The calcium sulfate paste is compacted by extruding the paste through the die of, for example, a pug mill, to create a compacted form, usually a noodle, under either ambient or de-airing conditions. The materials are compacted at a pressure up to 1000 p.s.i., preferably between about 300 and 500 p.s.i. Pressures of this magnitude will tightly compress the calcium sulfate making a very high quality product. One aspect of the litter quality is its durability or its tendency to resist degradation into dust. Another is its density. A dense granule is desirable because it will not tend to hang in an animal's fur as much as a light product.

The noodles obtained directly from the extruder die are generally not useful shapes for animal litter which should be a granular material or pellet-like material with a well distributed particle size. Therefore, the noodles are broken down into pellets which are screened to remove fines and oversized particles which can then be recycled. Size reduction can be accomplished by a variety of methods and at different stages of the process after extrusion. The most direct method of size reduction is to shred the noodles with a rotating blade right at the die. The fineness of the granules and the particle size distribution depends upon the size of the die opening, the speed of the cutter, the number of blades on the cutter, and how closely the cutter blade is positioned to the exit surface of the die.

Size reduction can also be achieved with several types of separate grinding apparatus. A third option is to use both a die mounted fly cutter in conjunction with an auxiliary shredder. Depending upon the material mix and the size reduction method, it may be desirable to have an intermediate drying step to bring the compacted noodles to an optimum moisture content for grinding in order to produce the best granular material with the least amount of rejects. Usually it is necessary and desirable to bring the material to a moderately dry state where it ceases to deform plastically and will crush or break to make granules without producing dust. Optionally, a binder such as those described above may be added to the paste.

The pellets are then dried at a temperature from about 50° C. to about 430° C. until the gypsum is calcined. The drying temperature will depend upon the type of drying equipment used, such as a rotary dryer or a fluid bed dryer.

In another embodiment of the process of this invention, the gypsum powder, as described above, is conveyed to a mixing station where a binder is dry mixed with the gypsum or the binder is misted onto the gypsum powder as it is introduced to a pelletizer, such as a rotating disc pelletizer, pin mixer, rotary drum or the like, to form pellets. The pellets are discharged from the pelletizer onto a conveyor belt which introduces the pellets to a sizing screen and/or a dryer, such as a rotary dryer. The dryer in rotation tumbles the pellets at a temperature from about 50° C. to about 430° C. until the gypsum is calcined.

The characteristics of the calcined gypsum animal litter of this invention allows the litter to be flushed with no adverse consequences to plumbing or the environment. In addition, the clumping characteristics are believed to encapsulate the odor resulting from the presences of *escherichia coli* in the waste products of the animals. The calcined gypsum animal litter forms a product which clumps on contact with the waste and significantly eliminates odor by neutralizing ammonia. Also, the animal litters of this invention resist crushing and dusting in shipment, storage or use. The animal litter product, because it is primarily calcium sulfate, is itself an agriculturally valuable product. Thus, disposal of encapsulated waste can be accomplished by spreading it on land since it makes a good fertilizer.

In another embodiment of the present invention, an absorbent granules animal litter may be made by adding urea to gypsum to form a complex. The urea in solution may be added to the gypsum in a number of ways but preferably a dilute solution of urea is sprayed onto powdered gypsum in a granulator pan. The amount of urea in the final product is from about 1% by weight to about 8% by weight.

The urea/gypsum complex is dried at a temperature sufficient to melt the urea, preferably between about 280° F. and about 320° F. for a time sufficient to dry the granules, typically about 4 minutes to 6 minutes. The urea which has coated the gypsum during the pan granulation will melt and form a bridge between the gypsum particles. In the complex which forms between urea and gypsum the water molecules of crystallization are replaced by urea molecules according to the following reaction:

$$CaSO_4 \cdot 2H_2O + 2CO(NH_2)_2 \rightarrow CaSO_4 \cdot 2CO(NH_2)_2 + 2H_2O$$

The granular particle may be screened to a particle size range between 4 mesh and 100 mesh. Because urea contains available nitrogen for crop use, the urea bound gypsum granules have an advantage over other binders of the same cost when applied to the soil on which plants are growing.

In yet another embodiment of this invention, a deodorizing absorbent animal litter may be made by adding a dilute solution of urea, aluminum sulfate and sulfuric to gypsum to form a complex.

The dilute solution is prepared by mixing 500 mL of 3 M sulfuric acid, from 100 to 500 mL of a stock anhydrous aluminum sulfate solution made by dissolving 285 grams of aluminum sulfate in 1 liter of water, from 40 to 160 mL of a stock urea solution containing 0.5 g urea/mL, and from 90 to 610 mL of water to dilute.

The dilute solution may be added to the gypsum in a number of ways but preferably it is sprayed onto powdered gypsum in a granulator pan. The amount of urea in the final product is from about 1% by weight to about 8% by weight. About 250 mL of the solution is added to each kilogram of powdered gypsum and mixed to form granules. The granules are dried at a temperature sufficient to melt the urea, preferably between about 138° C. and about 160° C. for a time sufficient to dry the granules, typically about 4 minutes to 6 minutes.

The $H_2SO_4$ is added to neutralize the small amount of lime ($CaCO_3$) in the gypsum according to the following reaction:

$$CaCO_3 + H_2SO_4 \rightarrow CaSO_4 + H_2O + CO_2$$

This is desired because the $CaCO_3$ in the gypsum promotes the volatilization of ammonia ($NH_3$).

On average, a cat excretes 10 mL urine per event which will wet about 20 grams of litter. This volume of urine contains 1.2 grams urea. Assuming that all the urea in the urine hydrolyzes to ammonia according to the following reaction before being scooped:

$$CO(NH_2)_2 + 2H_2O \rightarrow (NH_4)_2CO_3 \rightarrow NH_3 + H_2O + CO_2$$

0.68 grams of ammonia will be produced from 10 mL of urine. According to the following reaction, $$Al_2(SO_4)_3 + 6H_2O + 6NH_3 \rightarrow 2\ Al(OH)_3 + 3\ (NH_4)_2SO_4$$

10 mL of urine will require 2.28 grams of $Al_2(SO_4)_3$ to effect neutralization of the odor. As it is unlikely that the hydrolysis of urea will take place so fast, less $Al_2(SO_4)_3$ than this maximum will be required. The hydrolysis of urea is likely to be suppressed because the soluble aluminum will inactivate the microorganisms responsible for this reaction.

The inter-relationship of the various components may be better understood by referring to the following examples.

EXAMPLES 1

An animal litter according to the present invention was produced by grinding waste gypsum wallboard in a roll crusher to a particle size between about 2 to 5 mm. The ground material was conveyed to a screen where almost all of the paper covering was separated from the powdered gypsum. The gypsum was conveyed to a tank where it was mixed with water to a moisture content of approximately 15% to form a paste. The paste was then agglomerated by passing through an extruder to compact the calcium sulfate. The hard pellets were then crushed and screened-to a particle size of from 6 mesh to 30 mesh.

The particles were then dried at a temperature of 200° C until they were calcined. The resulting litter was dry, odorless and had good absorption, clumping and tracking properties.

EXAMPLE 2

An animal litter according to the invention was made by producing a 50% urea stock solution as follows: 1 kilogram of urea was dissolved in 1 liter of hot water and then diluted to 2 liters with water. This solution contained 0.5 g urea/mL.

The granules were prepared by grinding waste gypsum in a roll crusher to a particle size between about 2 to 5 mm. The urea stock solution was diluted with water before being sprayed on the gypsum in the granulator pan depending on the concentration of urea required in the final product as indicated in Table 1.

TABLE 1

Urea stock solution formulation

| Weight of gypsum | Final urea content of product | Urea stock solution (A) | Water (B) | Volume of dilute area solution to be used per kg gympsum |
|---|---|---|---|---|
| kg | % | mL | ml | ml |
| 1 | 0 | 0 | 250 | 250 |
| 1 | 2 | 40 | 210 | 250 |
| 1 | 4 | 80 | 170 | 250 |
| 1 | 6 | 120 | 130 | 250 |
| 1 | 8 | 160 | 90 | 250 |

(Dilute area solution prepared by mixing A + B)

Thus, 250 mL of the particular dilute urea solution was used per kilogram of gypsum to be granulated. These amounts were based on the assumption that a 25% moisture content was required to prepare the granules. If a higher moisture content is desired additional water may be added to the pan separately. When the granulation was complete, the product was spread out in a thin layer and dried in an oven at a temperature between 138 and 160° C. for 4–6 minutes depending on the moisture content required in the final product. At this temperature, the urea (M.P. 132° C.) will melt and bond the particles together.

EXAMPLE 3

An animal litter according to the invention was made by producing a 50% urea stock solution as follows: 1 kilogram of urea was dissolved in 1 liter of hot water and then diluted to 2 liters with water. This solution contained 0.5 g urea/mL.

Next a stock aluminum sulfate solution was prepared. This solution was based on the use of anhydrous aluminum sulfate [$Al_2(SO_4)_3$]. If hydrated aluminum sulfate is used, it should first be dried at about 120° C. overnight to remove the water. 285 grams of $Al_2(SO_4)_3$ and dissolved in 1 liter of water by vigorous stirring. A stock solution of 3 M sulfuric acid was made according to the procedure set forth in Example 2.

A kitty litter was prepared by diluting the above reagents and spraying the solution on powdered gypsum in the granulator pan as indicated in Table 2. 250 mL of the particular mixed solution was used per kilogram of gypsum to be granulated. These amounts were based on the assumption that a 25% moisture content would be required to prepare the granules. If a higher moisture content is required, additional water should be added to the pan separately. When the granulation was complete, the product was spread out in a thin layer and dried in an oven at a temperature between 138 and 160° C. for 4–6 minutes depending on the moisture content required in the final product. At this temperature, the urea will melt and bond the particles together.

TABLE 2

Formulation of deodorizing and bonding solution for preparation of kitty litter granules

| Weight of gypsum | Dilute solution prepared by mixing A + B + C + D | | | | Volume of mixed solution to be added per kg of gypsum |
|---|---|---|---|---|---|
| | Volume of of 3 M sulfuric acid (A) | Volume of aluminum sulfate solution (B) | Volume of of urea solution (C) | Volume of water (D) | |
| kg | mL | mL | mL | mL | mL |
| 1 | 500 | 100 | 40 | 610 | 250 |
| 1 | 500 | 250 | 40 | 460 | 250 |
| 1 | 500 | 500 | 40 | 210 | 250 |
| 1 | 500 | 100 | 80 | 570 | 250 |
| 1 | 500 | 250 | 80 | 420 | 250 |
| 1 | 500 | 500 | 80 | 170 | 250 |
| 1 | 500 | 100 | 120 | 530 | 250 |
| 1 | 500 | 250 | 120 | 380 | 250 |
| 1 | 500 | 500 | 120 | 130 | 250 |
| 1 | 500 | 100 | 160 | 490 | 250 |
| 1 | 500 | 250 | 160 | 340 | 250 |
| 1 | 500 | 500 | 160 | 90 | 250 |

A test of the efficacy of the deodorizing system was conducted by placing 5 mL of a solution containing 0.17 g $NH_3$ (25% of the maximum possible) on the litter and covering it with about 3 mm of fresh litter. No ammonia odor could be detected in any of the litter samples containing $Al_2(SO_4)_3$ but odor was very strong in untreated litter.

The preparations in Table 2 contain 5, 10 and 20% of the maximum level of $Al_2(SO_4)_3$ required in 20 grams of litter because the cat buries its urine thus surrounding it by unwetted litter which will assist in absorbing any odor.

The litter is highly absorbent of ammonia and the aluminum will inhibit the activity of microorganisms responsible for the decomposition of urea and other constituents of urine to ammonia. Scooped material can be disposed of by application to flower beds where it acts as a fertilizer.

While the present invention has been described in connection with the exemplary embodiments thereof, it will be understood that any modification will be apparent to those of ordinary skill in the art and that this application is intended to cover any adaptations or variations thereof. Therefore, it is intended that this invention be limited only by the claims and equivalents thereof.

That which is claimed is:

1. A process for making an animal litter composition comprising:

preparing a solution comprising 500 mL of 3 M sulfuric acid, from 100 to 500 mL of a aluminum sulfate solution made by dissolving 285 grams of anhydrous aluminum sulfate in 1 liter of water, from 40 to 160 mL of a stock urea solution containing 0.5 grams urea/mL, and from 90 to 610 mL of water to dilute;

adding about 250 mL of said solution to each kilogram of powdered gypsum and mixing to form granules; and heating said granules to a temperature sufficient to melt said urea and to convert the gypsum to calcium sulfate hemihydrite or calcium sulfate anhydrite.

2. The process according to claim 1 wherein said granules are heated from 4 to about 6 minutes.

3. The process according to claim 1 wherein said gypsum is post industrial waste gypsum, synthetic gypsum or combinations of thereof.

4. The process according to claim 1 wherein the supplied urea reacts according to the formula, $$CaSO_4 \cdot 2H_2O + 2CO(NH_2)_2 \rightarrow CaSO_4 \cdot 2CO(NH_2)_2 + 2H_2O.$$

5. A process for making an animal litter composition comprising:

preparing a solution comprising from 40 to 160 mL of a stock urea solution containing 0.5 g urea/mL, and from 90 to 610 mL of water to dilute;

adding about 250 mL of said solution to each kilogram of powdered gypsum and mixing to form granules; and heating said granules to a temperature sufficient to melt said urea and to convert the gypsum to calcium sulfate hemihydrite or calcium sulfate anhydrite.

6. The process according to claim 5 wherein said gypsum is post industrial waste gypsum, synthetic gypsum or a mixture thereof.

7. The process according to claim 5 wherein said granules are heated from 4 to about 6 minutes.

8. The process according to claim 5 wherein the supplied urea reacts according to the formula, $$CaSO_4 \cdot 2H_2O + 2CO(NH_2)_2 \rightarrow CaSO_4 \cdot 2CO(NH_2)_2 + 2H_2O.$$

* * * * *